United States Patent [19]

Inoue et al.

[11] Patent Number: 5,766,801
[45] Date of Patent: Jun. 16, 1998

[54] LAYER BUILT SEALED ALKALINE STORAGE BATTERY

[75] Inventors: Hiroshi Inoue, Neyagawa; Shinji Hamada, Hirakata; Munehisa Ikoma, Shiki-gun, all of Japan

[73] Assignee: Matsushita Electric Industrial Co., Ltd., Osaka, Japan

[21] Appl. No.: 734,215

[22] Filed: Oct. 21, 1996

[30] Foreign Application Priority Data

Oct. 24, 1995 [JP] Japan ................ 7-275315

[51] Int. Cl.$^6$ ........................................... H01M 2/10
[52] U.S. Cl. ........................ 429/99; 429/159; 429/206
[58] Field of Search .................... 429/96, 99, 100, 429/148, 149, 156, 159, 163, 206

[56] References Cited

U.S. PATENT DOCUMENTS

| | | | |
|---|---|---|---|
| 2,980,751 | 4/1961 | Toce et al. | 429/156 X |
| 3,623,917 | 11/1971 | Chassoux | 429/148 X |
| 3,664,877 | 5/1972 | Shaw | 429/159 X |
| 3,846,179 | 11/1974 | Shaw | 136/171 |
| 4,020,244 | 4/1977 | Selinko | 429/100 |
| 4,065,603 | 12/1977 | Coibion | 429/99 |
| 4,317,497 | 3/1982 | Alt et al. | 180/68.5 |
| 4,339,049 | 7/1982 | Gillespie | 220/23.4 |
| 5,037,711 | 8/1991 | Bonnaud et al. | 429/156 |
| 5,492,779 | 2/1996 | Ronning | 429/148 X |

FOREIGN PATENT DOCUMENTS

| | | |
|---|---|---|
| 0 644 604 | 3/1995 | European Pat. Off. . |
| 0 669 663 | 8/1995 | European Pat. Off. . |
| 0 732 759 | 9/1996 | European Pat. Off. . |
| 1 267 153 | 7/1961 | France . |
| 50 854 | 8/1989 | Germany . |
| 3-32364 | 3/1991 | Japan . |
| 3-92358 | 9/1991 | Japan . |
| 6-150963 | 5/1994 | Japan . |

*Primary Examiner*—Anthony Skapars
*Attorney, Agent, or Firm*—McDermott, Will & Emery

[57] ABSTRACT

A layer-built sealed alkaline storage battery includes plural rectangular cell units 11. Those cell units 11 are arranged in a row and united together with a pair of end plates 1 and 2 arranged at the opposite sides of the assembly of the cells by belt-like clamp bands 37, 38 each extending cross from one of the end plates 1 through the cell units 11 to the other of the end plates 2 and being fixed at the end thereof on the end plates 1, 2. Each end plate 1 or 2 is of one-piece structure having 1) a generally rectangular panel portion or portions 26 and 2) a peripheral wall frame 26 and 3) reinforcement ribs 23a to 23c, so that the assembly of the cell can be united so as to be prevented from deformation due to expansion and vibration of the cells.

7 Claims, 12 Drawing Sheets

Fig. 25 PRIOR ART
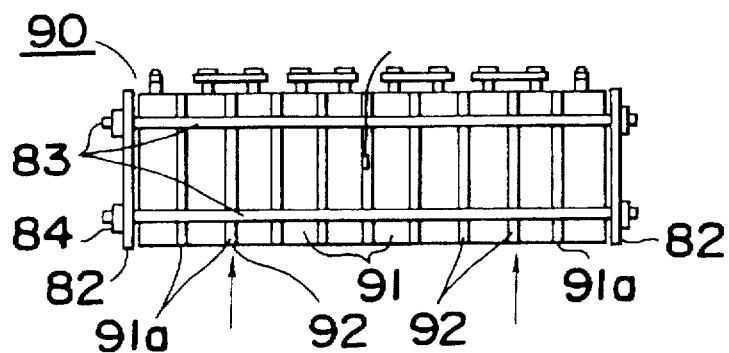
PRIOR ART
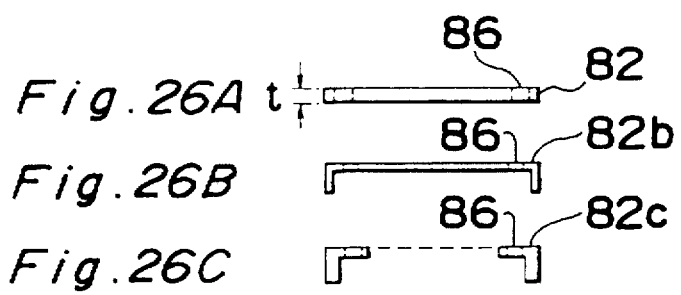

LAYER BUILT SEALED ALKALINE STORAGE BATTERY

BACKGROUND OF THE INVENTION

1. Field of the Invention

The invention relates to a structure of layer-built sealed alkaline storage battery comprising a plurality of rectangular cells arranged in a row, especially to a clamping means for the assembly of the cell units.

2. Description of the Prior Art

Layer-built sealed alkaline storage batteries such as a Nickel-Hydrogen battery and a Nickel-Cadmium battery becomes popular in an electric power source for portable devices such as communications equipments and VTR provided with a camera, due to those superior charge-discharge characteristics, good reliability and easy handling. Although a conventional battery such as a cylindrical type one having a capacity of less than 2 Ah and a square type one having a capacity of about 1 Ah has been used with no problem because it has a small heating value and a good heat radiation with a good strength resistant to a gas pressure of 5–10 Kgf/cm$^2$ or more, there are, however, the following problems in case of the assembly of the layer-built sealed alkaline storage battery having a large capacity of several tens Ah to 300 Ah, which is used for a high voltage and high energy density usage such as electric vehicles, home electric equipments and reserve electric sources:

The layer-built sealed alkaline storage battery having a large capacity is designed to have a rectangular shape having longer sides and shorter sides. On the other hand, accompanied with a large sized tendency the heat generation increases and the heat radiation decreases, so that a temperature of the battery increases due to heat accompanied with a gas absorption reaction during a charging cycle because there is used a sealed vessel for absorbing oxygen gas generated at a positive side by means of reacting it with a negative material.

Further, a pressure of inner gas of the battery increases in the Nickel-Hydrogen battery as the discharge capacity decreases. A laminated electrode structure is expanding with the cycle progress. Therefore, in case of the large capacity battery having a large area in the longer side, the inner gas pressure and the expansion power in the laminated electrode structure cause expansion and deformation of cell bathes, resulting in a remarkable cell performance fall and thus leading to a failure of the apparatus actuated by the battery.

In case of the layer-built battery comprising the assembly of the battery cells in series, it is difficult to adopt a mono-block bath because of the heat generation problem, the high inner pressure and the alkaline electrolysis creeping problem which lowers the battery performance. Therefore, there is proposed a bath system comprising a means for radiating heat and a means for preventing expansion and deformation of the battery, wherein a plurality, for example 5 to 10 of cell units are arranged in a row to be abutted to each other at longer sides thereof.

In FIG. 23 as shown in Japanese Utility Model Kokai Hei 3-32364 and Hei 3-92358, there is shown an alkaline storage battery 70 used for a space satellite wherein there are arranged in a row three sets of cells positioned on both sides of a reverse T shaped flame and side flames 73 of L-shaped thick plate at the opposite sides of the cell assembly. The L-shaped side flames are connected to each other by a connecting bolt 74 and a nut 75 into a one body. Adjustment of the connecting bolt can prevent deformation of the longer side of the cell. The reverse T shaped metal flame 72 abutting to the cell units 71 can draw heat from the cells and radiate it toward a panel where the cells are loaded.

In FIGS. 24 and 25, there is shown a large capacity layer-built sealed Metal oxide-Hydrogen alkaline battery (hereinafter referred to as a module battery) provided with a heat radiation system and a one body structure. In FIG. 24, 10 pieces of the cell units 81 are arranged in a layer-built manner and combined into one body battery 80 by a pair of metal reinforcement plates 82 at opposite sides and a bolt 83 and a nut 84. A temperature sensor 85$d$ or its combination with a voltage detector 85$c$ actuate a control circuit 85$b$ to prevent a temperature increasing of the battery on charging by means of a temperature controlled charger 85 for controlling a current value from a charger 85$a$.

In FIG. 25, there is shown a layer-built storage battery 90 assembled by the same means as that of FIG. 24, wherein each of cell units 91 is provided with spacers 91$a$ to hold a determined space extending vertically therebetween, where an air flow can be made as shown by an arrow by means of an air blower, resulting in good heat radiation from the battery for preventing poor quality of the battery. The reinforcement elements for combining the cell units into one body can be made of metal materials having a good conductivity such as copper, aluminum, iron and nickel in a flat shape 82 shown in FIG. 26A. or any other shapes such as an inverted U sectional shape 82$b$ shown in FIG. 26B and a L sectional shape 82$c$ shown in FIG. 26C. A insert hole of the bolt 83 is indicated by 86.

In FIG. 27, there is shown another reinforcement element 96, which is made of metal materials by machining, casting and die-casting and is provided with plural rows of protruded fins 96$b$ at the surface of base portion 96$a$. A hole for mounting connecting elements such as bolts is indicated by 96$c$.

In case of adopting the layer-built sealed alkaline storage battery as an electric source of electric motor vehicles. Compact and light series connection of several 10 to 300 cells is required for limiting a total volume and lowering a total weight in order to improve driving performance.

Further, in order to improve availability and performance of the vehicle, large current for quick charge of the battery and starting or climbing operation of the vehicle is needed, which causes increased inner pressure of the cells and expanded stress of the laminated plate structure, resulting in deformation of the cell, especially increased expansion of the longer side portion.

As shown in FIG. 23, the alkaline battery assembly 70 comprises plural inverted T shaped metal flames 72, L sectional shaped side flames 73 and connecting bolts 74 and nuts 75 in order to prevent deformation of the cell unit 71 due to expansion and improve the resistance to vibration and the radiation effect, but such a construction is necessarily accompanied with large space and heavy weight which make the battery assembly unsuitable for the portable.

On the other hand, the cell assembly shown in FIGS. 24 and 25 is clamped mainly by the flat plate reinforcement 82 together with the inverted U sectional and L sectional shaped reinforcements 82$b$ and 82$c$ as shown in FIGS. 26A, 26B and 26C, which are combined by the bolt 83 inserted in the holes 86 thereof and the nuts 84. However, the deformation pressure due to the inner pressure of each cell units and expansion of the laminated plate structure is applied to the peripheral portion around the holes 86 with the bolt 83, where the reinforcement 82 tends to be deformed. Therefore, the reinforcement 82 should be made of thicker plate materials. Considering the strength and the weight of the reinforcement, hard aluminum material is better than steel materials. However, even if the hard aluminum material is used, a desired thickness of the flat reinforcement 82 must be 6 to 10 mm, preferably more than 8 mm, resulting in an increased weight in case of 100 Ah type batteries. It is difficult to decrease the thickness of the inverted U sectional reinforcement 82b if it would be made of the hard aluminum. In case of the L sectional shaped ones, it is difficult to prevent expansion of the battery and combination with the flat ones makes the total structure complicated and become heavy.

Further, in case of the reinforcement 96 shown in FIG. 27, plural protruded fins 96b helps heat radiation, but can not decrease the battery expansion and its strength should be kept by its thickness, resulting in a heavy weight construction and complicated machining production.

For providing a structure to solve the problem, we tested side flames and end plates in place of the conventional reinforcement. FIG. 19 shows a successful type one having a good fixture strength and a decreased weight while FIG. 21 shows an unsuccessful type one having an insufficient strength. FIG. 19 is a perspective view of the layer-built sealed alkaline storage battery 41 assembled by end plates S 43 shown in FIG. 20. In the figure, 5 rectangular cell units are constructed by a resin made bath 42a including electrode plates sealed by positive and negative terminals 42c and a resin made lid 42b provided with a safety valve and so on to be arranged side by side. The end plate shown in FIG. 10B comprises a rectangular flat portion 43d, four side wall flames 43a, 43b vertically standing on the four side thereof and connecting each other and three reinforcing ribs 43c extending parallel to the top and bottom side walls 43b from one side wall 43a to the opposite side wall 43a. Parallel to the top and bottom side walls 43b. The end plate 43 can be made of thick metal plate such as aluminum alloy plate by machining, plating and surface finishing. The end plates are positioned at the end surfaces of the cell laminated direction to press the cell assembly into a limited size and are clamped with the cell assembly by a metal binding band 44 into one body, which is fixed through fixing hole 44a and 44e by rivets 45. Each positive and negative electrodes 42c are connected in series by a connecting plate 46 to give a completed layer-built battery 41. The embodiment having a wide ranged capacity of 100 to 120 Ah has a size of 110 mm wide (W) and 140 mm high (L) as shown in FIG. 20. In case of serial connection of several 10 to 100 cells, the layer laminated number of 10 would be desired considering the total weight. Considering a deformation stress of about 1,000 kgf due to expansion loaded on the end plate during the battery life, the binding strength between the end plate S and the binding band requires resistance against more than 1,000 kgf, if desired more than 1,500 to 2,000 kgf. As a result of testing from this aspect, considering weight of the end plate and productivity by machining, plating and polishing, the hard aluminum material is best for the end plate, which is designed to have a size of W=100 mm, L=140 mm, wherein the side wall flame is 14 mm high (h1) and 3 mm thick (t1): the top and the bottom wall flame is 11 mm high (h2) and 2 mm thick (t2), the flat portion 43d is 3 mm thick. The binding band is made of a stainless steel plate or a nickel plated steel plate having a wideness of 20 to 30 mm and a thickness of 1 mm. The embodiment meets the strength as demanded above and realizes the light-weight body compared with the layer-built storage battery combined by the conventional side plate or reinforcement.

FIG. 21 shows an end plate 47 provided with lib plates 48 (3 mm thick) separately made and attached thereto by welding. The end plate 47 is easy to be machined because of no fixation between both ends of lib plates 48 and the wall flames 47a, but the deformation strength due to expansion decreases by more than 20%. The strength can not be compensated by the double thickness (4 mm).

FIG. 22 shows an end plate 49 made from a flat plate 49a which sides are folded up vertically. At all the portions such as the flat portion 49e, the wall portions 49a, 49b, 49c and 49d, the deformation strength decreases remarkably. Even if the end plate is made of an aluminum alloy plate having a thickness of 4 mm (1.2 times weight) of a steel plate having a thickness of 2 mm (1.7 times weight), it has not a sufficient strength.

Accordingly, compared with the above embodiment, the end plate 43 shown in FIG. 20 is better than that shown in FIG. 21 because of a continuous wall flame (43a–43b) having a strong resistance against the folding deformation and a three dimensional construction of the wall flame and the reinforcing ribs.

However, the end plate of FIG. 20 needs a long processing time because of machining thick plates such as aluminum alloy plate and can not be prepared by a mass production method, resulting in high cost and thus there comes disadvantages compared with the conventional reinforcement such as flat plates. Further, the aluminum material has a problem because of short of long time resistance to alkaline corrosion.

SUMMARY OF THE INVENTION

Accordingly, a first object of the present invention is to provide a structure for combining the assembly of cells into one body and strengthening elements.

Further, a second object of the present invention is to provide a structure adaptable for mass production and low cost production.

According to the first aspect of the present invention, there can be provided a layer-built sealed alkaline storage battery, comprising plural rectangular cell units, each cell unit including a positive electrode plate, a negative electrode plate, a separator intervening between the positive and negative electrode plates and an alkaline electrolyte accommodated within a vessel sealed with a lid provided with terminals, said cell units being arranged in a row and united together with a pair of end plates arranged at the opposite sides of the assembly of the cells by belt-like clamp bands each extending from one of the end plates through the cell units to the other of the end plates and being fixed at the end thereof on the end plates, wherein the end plate is of one-piece structure having 1) a generally rectangular panel portion or portions and 2) a peripheral wall frame including top, bottom and side flanges to enclose panel portions and protruding outwardly substantially at right angles to the rectangular panel portions and 3) reinforcement ribs arranged parallel to the top and bottom flanges and connected to the opposite side flanges so as to protrude in a direction in which the peripheral wall protrudes from the rectangular panel.

The layer-built sealed alkaline storage battery according to the present invention, comprises a clamping system including the inventive end plate prepared by a mass producible method and thus has a large binding strength for resisting against deformation pressure due to expansion, vibration and shock in spite of a light-weight.

According to a embodiment of the present invention, the top and bottom flanges of the peripheral wall frame may be connected to the rectangular panel portion through a rounded juncture and a rib, both extending parallel to the top and bottom flanges and connected to the side flanges, so that the end plate has a strong structure.

The end plate may be provided with the opposite side flanges having band grooves where the clamp bands are secured.

According to another embodiment of the present invention, the end-plate may be provided with opposite side flanges having a double-wall structure including an inner side flange segment and an outer side flange segment continued from and overlapping the inner side flange segment, so that the end plate has a more strong structure.

In the embodiments, the opposite ends of each clamp band are so shaped as to represent hooks which are hooked to the side flanges, so that the end plate can be combined more tightly by the clamping band compared with the conventional method.

According to a further more embodiment of the present invention, the clamping band has a pair of double walled opposite ends which are able to hook corresponding portions of side walls, so that there can be provided a strong clamping band.

In the embodiments, the cell unit is so designed as to have a space for ventilation between the neighboring cell units, resulting in preventing an increased temperature and also getting a strong binding power between the cell units.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 25 is a schematic side view of a further prior art storage battery;

FIGS. 26A, 26B and 26C are schematic explanatory diagrams showing reinforcements employed in the prior art storage battery.

DETAILED DESCRIPTION OF THE EMBODIMENTS

First Embodiment—FIGS. 1 to 9

Figure 1:
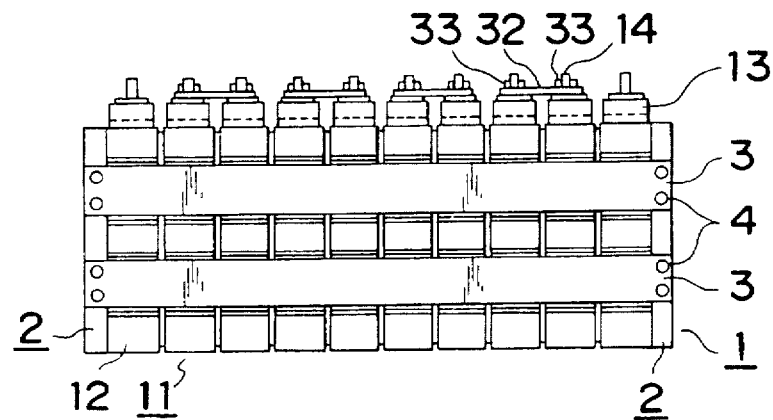
FIG. 1 is a schematic side view of a layer-built sealed storage battery according to a first embodiment of the present invention.

Referring particularly to FIGS. 1 to 9, a layer-built sealed alkaline storage battery 1, hereinafter referred to as a battery module, is shown as including ten cells, generally identified by 11, that are assembled together in side-by-side fashion. Each of the cells 11 comprises a generally rectangular-box like vessel 12 opening upwardly and made of synthetic resin such as, for example, polypropylene, a laminated electrode structure (not shown) accommodated within the vessel 12 and including positive electrode plates made of nickel oxide as a principal component and negative electrode plates made of a hydrogen absorbent alloy as a principal component, each said negative electrode plate being sandwiched between the neighboring positive electrode plates with a separator intervening between the positive and negative electrode plates, a alkaline electrolyte filled in the vessel 12, and an oblong lid 13 made of the same material as that for the vessel 12 and having a peripheral flanges fusion bonded at 16 to the vessel 12 to close the opening thereof. The oblong lid 13 has positive and negative pole terminals, generally identified by 14, and a safety valve 15. In any event, since the individual cells 11 may be of any known structure and do not constitute subject matter of the present invention, no further detail thereof will be reiterated for the sake of brevity.

Figure 4:
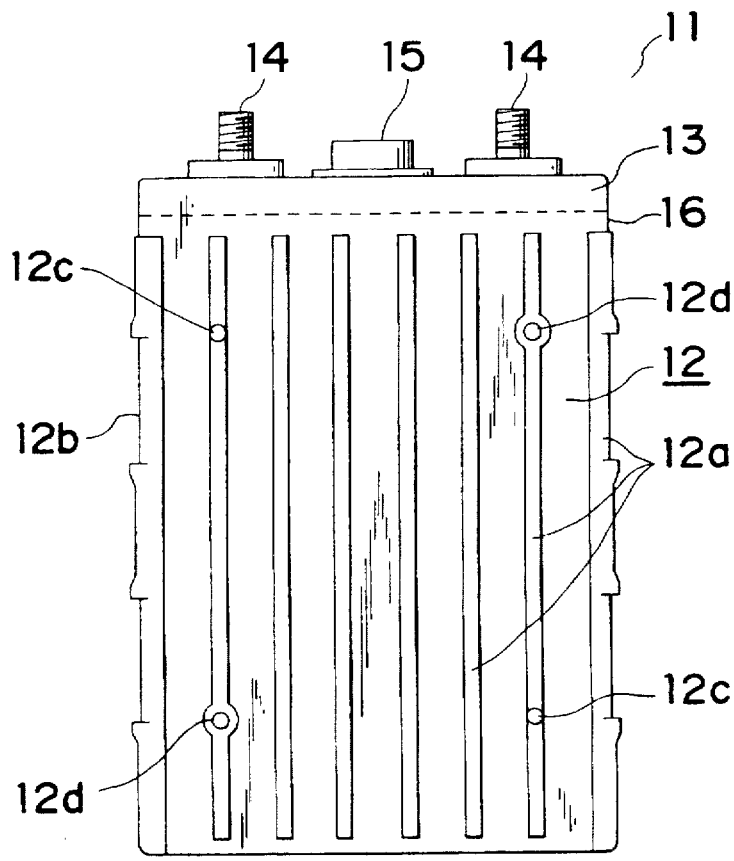
FIG. 4 is an elevational view, on an enlarged scale, of one of cells forming the storage battery shown in FIG. 1.
Figure 6:
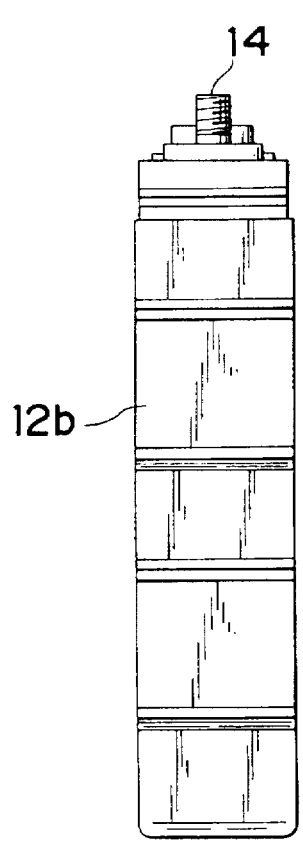
FIG. 6 is a side view of the cell shown in FIG. 4.
Figure 5:
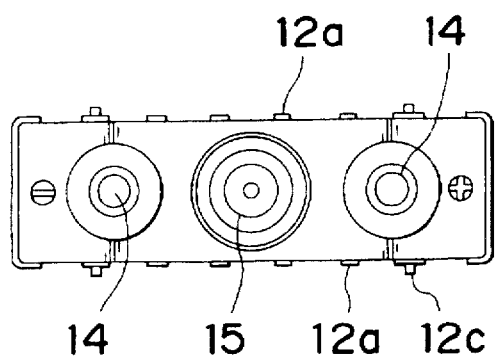
FIG. 5 is a top plan view of the cell shown in FIG. 4.

For the purpose of the description of the present invention, however, each cell 11 is to be understood as having first and second rectangular major surfaces opposite to each other, longer side faces opposite to each other and shorter top and bottom faces opposite to each other, the top face being represented by the lid 13. As best shown in FIGS. 4 to 5, each of the first and second major surfaces of each cell 11 is formed with a plurality of parallel ribs 12a so as to extend in a direction generally parallel to the longitudinal axis thereof so that, when the cells 11 are assembled together to provide the battery module 1, the ribs 12a on the first major surface of one cell 11 may be held in contact with the ribs 12a on the second major surface of the next adjacent cell 11 to define stripes of vent space 31 between those cells 11 as shown in FIG. 2.

Alternatively, the ribs 12a on the first and second major surfaces of each cell 11 may be positioned relative to each other in any suitable manner so that stripes of space 31 can be defined by the ribs 12a between the first major surface of one cell 11 and the second major surface of the next adjacent cell 11 in any way whatsoever. For example, the ribs 12a on the first and second major surfaces of each cell 11 may be displaced relative to each other a distance about equal to the pitch between the neighboring ribs 12a on each of the major surfaces so that when the cells 11 are assembled together to provide the battery module 1, the ribs 12a on the first major surface of one cell 11 may be held in contact with the second major surface of the next adjacent cell 11 in a fashion interleaved with the ribs 12a on the second major surface of such next adjacent cell 11.

Each of the longer side faces has a plurality of, for example, at least two, transverse recesses 12b for accommodating therein respective thicknesses of clamp bands 3 that are used to clamp the assembly of the cells 11 together as will be described later.

Figure 2:
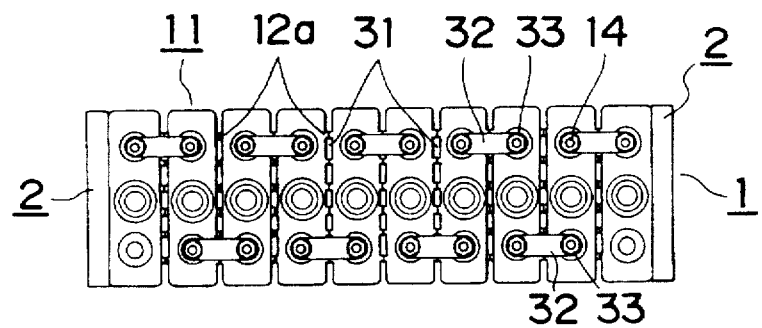
FIG. 2 is a top plan view of the sealed storage battery shown in FIG. 1.
Figure 3:
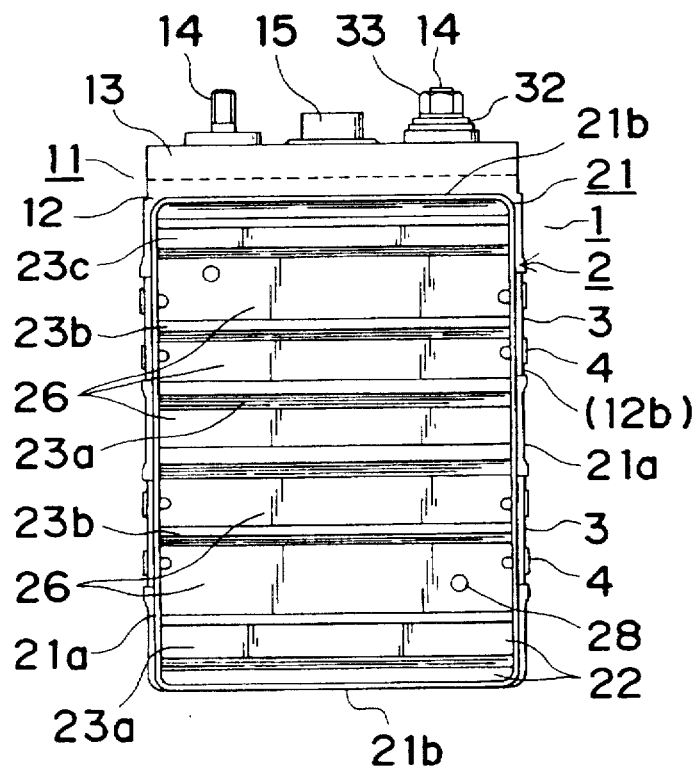
FIG. 3 is an end view of the storage battery shown in FIG. 1.

As best shown in FIGS. 1 and 2, the cells 11 are juxtaposed and assembled together with the first major surface of one cell 11 confronting the second major surface of the next adjacent cell 11. To facilitate assemblage of the cells 11 in the juxtaposed fashion, anchor protuberances 12c and anchor recesses 12d are formed on the first and second major surfaces of each cell 11 in respective patterns complemental to each other so that when the cells 11 are assembled together, the anchor protuberances 12c on the first major surface of one cell 11 can be engaged in the anchor recesses 12d on the second major surface of the next adjacent cell 11 while the anchor recesses 12d on the first major surface of such one cell 11 can receive therein the anchor protuberances 12c on the second major surface of such next adjacent cell 11.

The cells 11 so juxtaposed in the manner described above are clamped together by means of generally rectangular cup-like end plates 2 that are connected together by means of the clamp bands 3. Each of the end plates 2 is formed by the use of a press work applied to a thin steel plate so as to have three types of parallel reinforcement ribs 23a, 23b and 23c extending widthwise of the respective end plate 2. Each end plate 2 is of one-piece structure including two side flanges 21a opposite to each other and top and bottom flanges generally identified by 21b. After the end plates 2 have been fitted to the opposite outermost ones of the assembled cells 11 while the cells 11 have been pressed together so as to render the sum of the respective thickness (as measured between the first and second major surfaces of each cell 11) thereof to meet a required value, the opposite end plates 2 are connected together by means of the clamp bands 3, each 25 to 30 mm in width and 1 mm in thickness, two bands 3 positioned on each side of the assembly, with their opposite ends riveted or screwed as at 4 to the respective side flanges 21a of the end plates 2, to thereby complete the battery module 1. In the assembled condition, the bands 3 having their opposite ends riveted or screwed to the opposite side flanges 21a of the end plates 2 extends within the transverse recesses 12b defined in the opposite longer side faces of all of the cells 11. In this condition, the end plates 2 clamps the cells 11 together with the respective peripheral wall 21 protruding outwardly from the assembly of the cells 11 and in respective directions counter to each other. The positive and negative pole terminals 14 are connected in series by the use of connecting pieces 32 of a high electroconductive material such as, for example, nickel-plated copper alloy, to thereby complete the battery module 1.

The details of each end plate 2 and the details of manufacture thereof will now be described. It is to be noted that since the opposite end plates 2 are of identical structure, reference will be made to only one of them.

Figure 7:
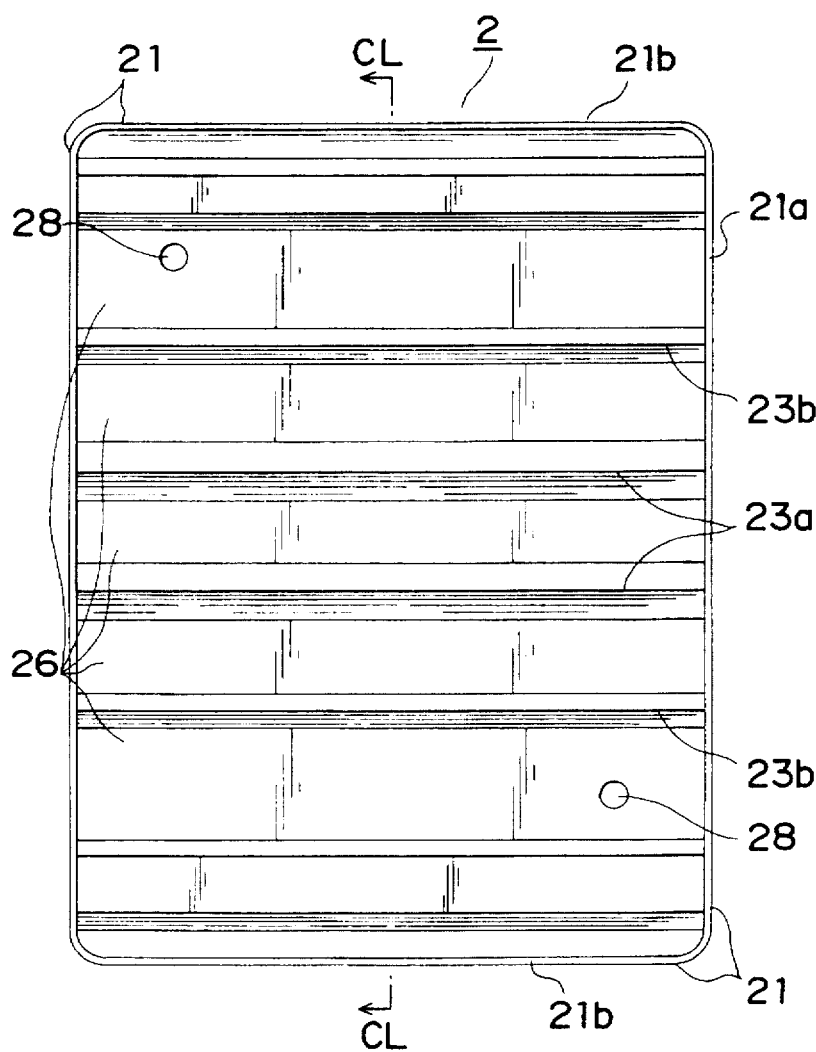
FIG. 7 is a front elevational view, on an enlarged scale, of one of opposite end plates employed in the storage battery of FIG. 1.
Figure 8:
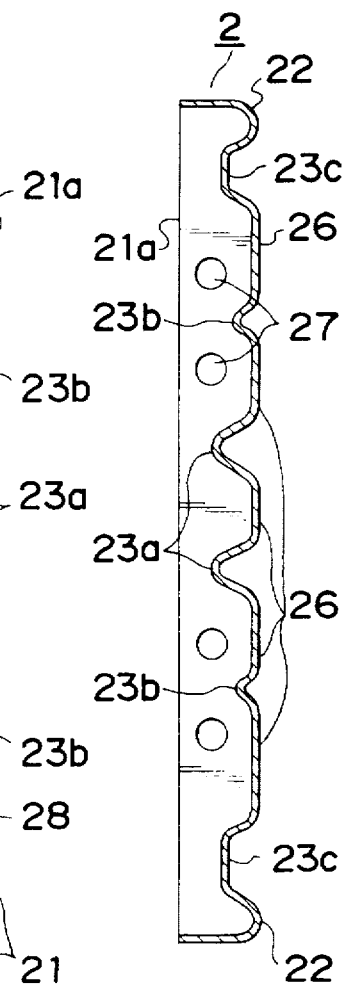
FIG. 8 is a cross sectional view of the end plate taken along the line CL—CL in FIG. 7.
Figure 9:
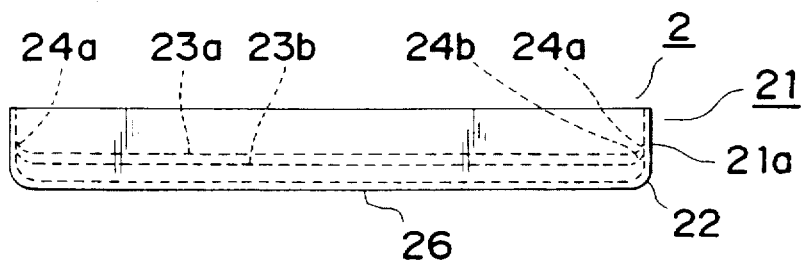
FIG. 9 is a top plan view of the end plate shown in FIG. 7.

With particular reference to FIGS. 7 to 9, the end plate 2 is shown in a front elevational view in FIG. 7 as viewed exteriorly towards the assembly of the cells 11, in a side sectional view in FIG. 8 and in a top sectional view in FIG. 9 as viewed from top of FIG. 7. The three types of the reinforcement ribs 23a, 23b and 23c referred to hereinbefore are best shown in FIG. 8.

While a thin metal plate is employed as a material for the end plate 2, a steel plate or a stainless steel plate of 1 to 1.2 mm in thickness is preferred as a material for the end plate 2 in terms of physical strength, weight and workability. The end plate 2 is of one-piece structure having a generally rectangular panel 26 having four sides from which a peripheral wall 21 including top, bottom and side flanges 21b and 21a protrude outwardly substantially at right angles to the rectangular panel 26. As can readily be understood from FIGS. 7 to 9, both four corners of the end plate 2 and the juncture between the rectangular panel 26 and the peripheral wall 21 are rounded as at 22.

Figure 19:
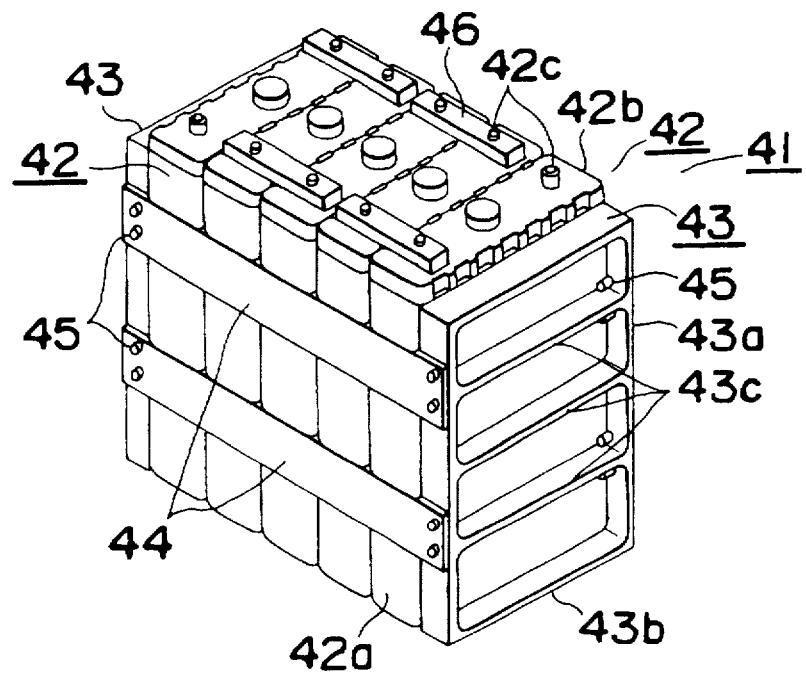
FIG. 19 is a perspective view of one sample storage battery devised by the inventors of the present invention in developing the present invention.
Figure 20:
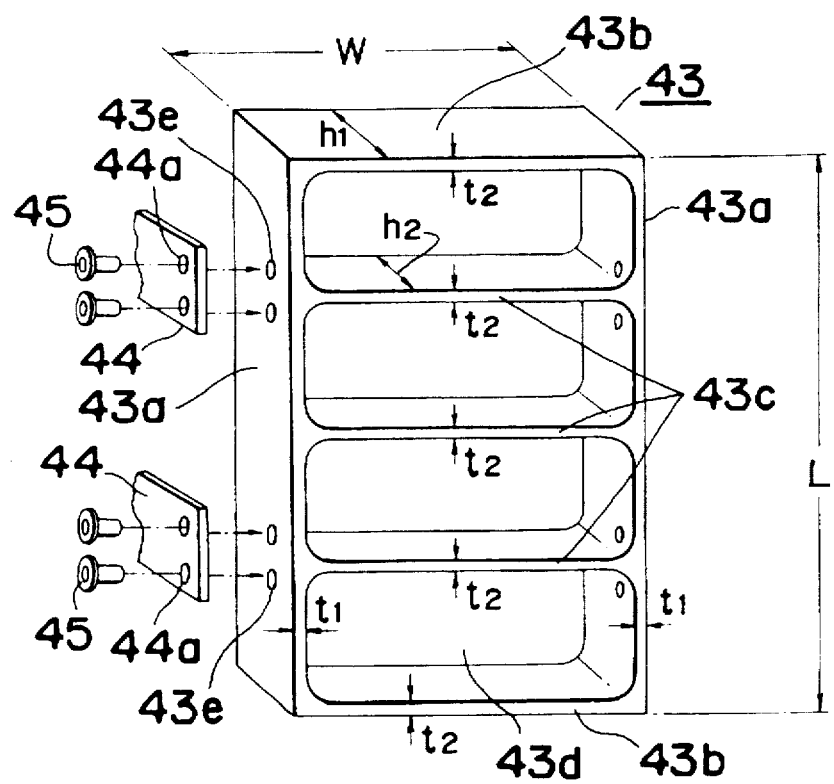
FIG. 20 is a perspective view, on an enlarged scale, showing the end plate used in the sample storage battery shown in FIG. 19.
Figure 21:
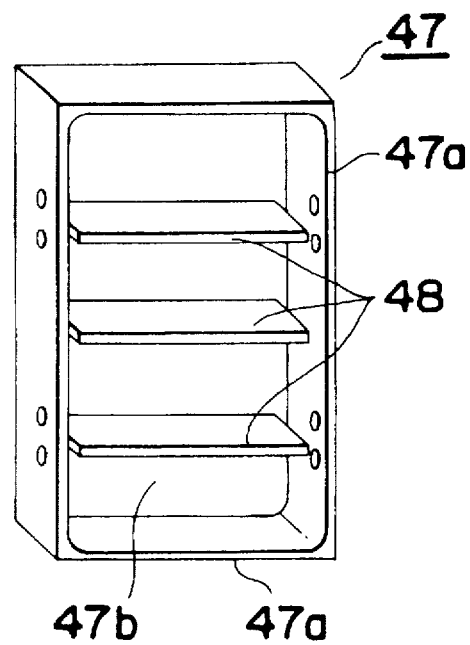
FIGS. 21 and 22 are perspective views showing the end plate used in different sample storage batteries devised by the inventors of the present invention in developing the present invention.
Figure 22:
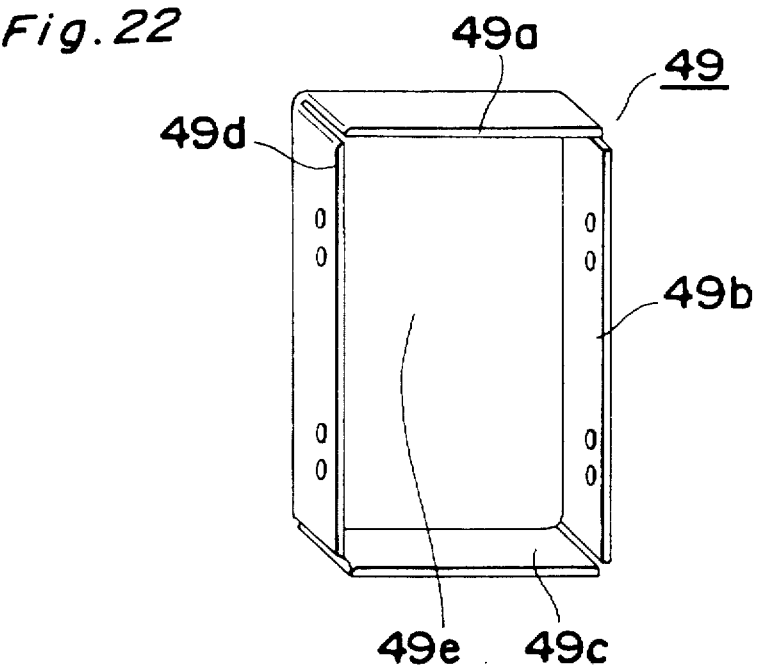

In order for the rectangular panel 26 to have an increases resistance to pressure-induced deformation, particularly a resistance to bending about an axis perpendicular to the longitudinal sense of the rectangular panel 26, the reinforcement ribs 23a, 23b and 23c of the three types are formed by the use of any known press work so as to protrude in a direction in which the peripheral wall 21 protrudes from the rectangular panel 26. The number of the types of the reinforcement ribs 23a, 23b and 23c may vary with the size of the end plate 2 and/or the shape of each reinforcement ribs, at least three types are necessary where the end plate 2 is of a size substantially identical with that shown in FIGS. 19 and 20, i.e., has a width W of up to 110 mm, a length L of up to 140 mm. In the illustrated embodiment, however, three types of the reinforcement ribs 23a, 23b and 23c totaling to the six reinforcement ribs are employed, of which the reinforcement ribs 23b are undersized relative to the reinforcement ribs 23a and 23c and are positioned laterally of respective regions of the side flanges 21a where the clamp bands 3 are riveted or screwed. It is to be noted that those regions of the side flanges 21a where the clamp bands 3 are riveted or screwed are formed with two holes 27 for each region for receiving rivets or screws shown by 4 in FIG. 1.

As best shown in FIG. 9, opposite ends of each of the reinforcement ribs 23a, 23b and 23c are continued to the associated side flanges 21a with the joint between each end of any one of the reinforcement ribs 23a to 23c and the adjacent side flange 21a being rounded as shown by the phantom line. The reinforcement ribs 23c adjacent to and extending substantially parallel to the top and bottom flanges 21b are preferably spaced as small a distance inwardly from the adjacent top and bottom flanges 21b as possible. By this design, any possible deformation which would occur in the vicinity of the peripheral wall 21, particularly a twist of the end plate during the use of the battery module 1, can advantageously be suppressed to thereby avoid any possible reduction in performance of the battery module 1. Accordingly, it is preferred that as shown in FIG. 8, each of the reinforcement ribs 23c is continued respectively from the rounded juncture 22 between the top or bottom flange 21b and a top or bottom edge of the rectangular panel 26.

Considering that the first and second major surfaces of each cell 11 are formed with the anchor protuberances 12c and anchor recesses 12d to facilitate assemblage of the cells 11 in the juxtaposed fashion as hereinbefore described, the rectangular panel 26 are formed with anchor holes 28 for receiving the anchor protrusions 12c in one of the cells 11 adjacent the end plate 2 when the latter is fitted to the assembly of the cells 11, that is, onto each outermost one of the assembled cells 11. Thus, by the provision of the anchor protrusion and recesses 12c and 12d in the cells 11 and the anchor holes 28 in the end plates 2, not only can the cells 11 be properly juxtaposed one after another, but also the end plates 2 can be properly aligned with the assembly of the cells 11, thereby avoiding any possible lateral displacement of the cells 11 and the end plates 2 which would otherwise occur under the influence of vibrations and/or an external force applied to the battery module 1.

Figure 10:
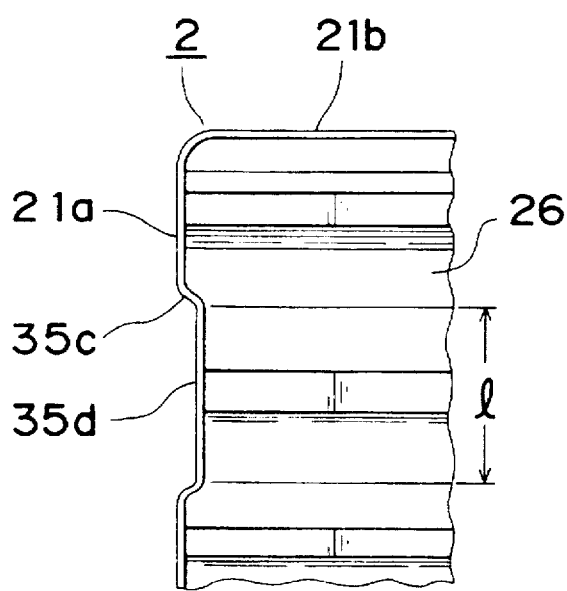
FIG. 10 is a fragmentary front elevational view of the end plate according to a second embodiment of the present invention.
Figure 11:
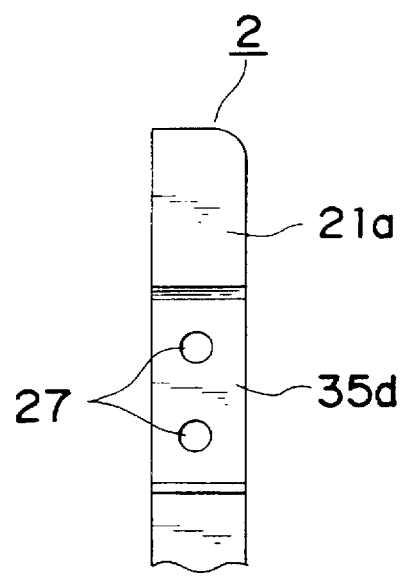
FIG. 11 is a fragmentary side view of the end plate shown in FIG. 10.

Second Embodiment (FIGS. 10 and 11)

In a second embodiment of the present invention shown in FIGS. 10 and 11, in order to increase the resistance of each side flange 21a of each end plate 2 to deformation and also to increase the clamp strength of the battery module 1, those regions of the side flanges 21a where the clamp bands 3 are secured are formed are inwardly recessed a depth substantially equal to or slightly greater than the thickness of the clamp band 3 so as to define band grooves 35d, only one of which is shown therein. Each band groove 35d has a width 1, delimited between steps 35c, which is substantially equal to or slightly greater than the width of the corresponding clamp band 3.

According to the embodiment shown in FIGS. 10 and 11, the presence of the steps 35c in the side flanges 21a makes it possible to increase the resistance of the side flanges 21a to bending and, therefore, it has been found that the strength of connection between the end of each clamp band 3 and the associated band groove 35d in the respective side flange 21a could be increased about 15 to 20% or higher (which strength of connection is hereinafter referred to as an "end-to-flange connecting strength"). Also, the presence of the band grooves 35d in the end plates 2 facilitates securement of the ends of the clamp bands 3 to the side flanges 21a since it provides a visual indication of where the ends of the clamp bands 3 are to be fitted. In addition, since the ends of the clamp bands 3 are received in the associated band grooves 35d once they are firmly screwed to the side flanges 21a in the form as received within the associated band grooves 35d, any possible loosening of screws used to connect the clamp band 3 to the side flange 21a which would occur under the influence of external vibration can advantageously be avoided.

It is to be noted that the band grooves 35d can readily be formed in the side flanges 21a during the formation of each end plate 2 by the use of any known press work and no extra process step is required only for the purpose of formation of the band grooves 25d.

Figure 12:
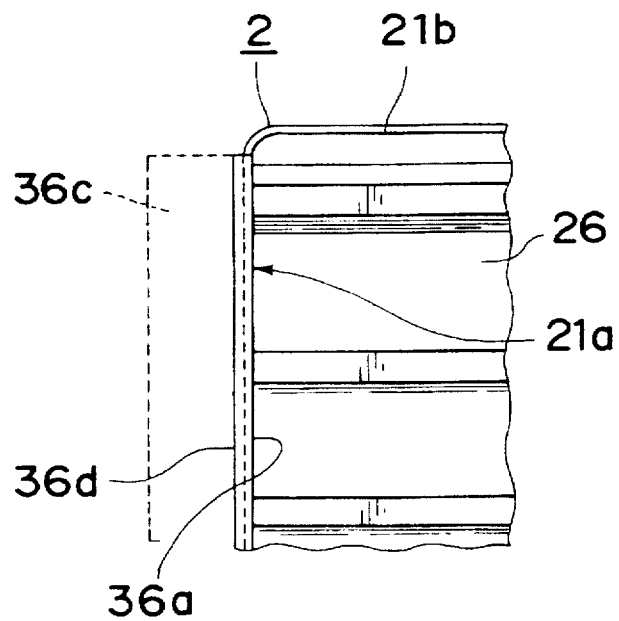
FIGS. 12 and 13 are views similar to FIGS. 10 and 11, respectively, showing the end plate according to a third embodiment of the present invention.
Figure 13:
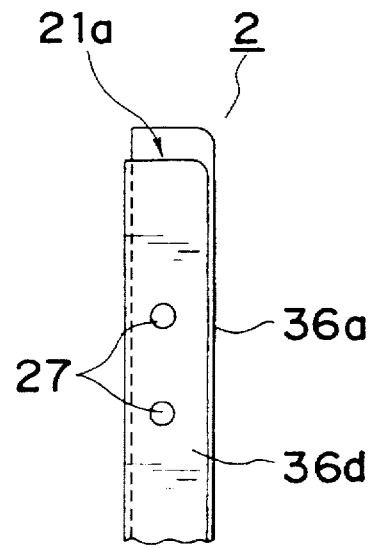

Third Embodiment (FIGS. 12 and 13)

Another method of increasing the resistance of each side flange 21a to deformation and also the clamp strength of the battery module 1 is shown in FIGS. 12 and 13. In this embodiment shown in FIGS. 12 and 13, each of the side flanges 21a is of a double-walled structure including an inner side flange segment 36a and an outer side flange segment 36d continued from and overlapping the inner side flange segment 36a. Specifically, when the end plate 2 is shaped by the use of the press work (particularly a trimming method), the side flanges 21a are allowed to have a large flat panel, shown by the phantom line 36c, which is subsequently folded outwardly to define the double-walled structure including the inner side flange segment 36a continued from the side edge of the rectangular panel 26 and the outer side flange segment 36d continued from the inner side flange segment 36a. Preferably, the inner and outer side flange segments 36a and 36d are welded together, for example, by means of a spot-welding technique, to further increase the physical strength thereof. With this design shown in and described with reference to FIGS. 12 and 12, it has been found that not only can each side flange 21a have an increased resistance to bending, but also the end-to-flange connecting strength could be increased about 30% or higher.

Figure 14:
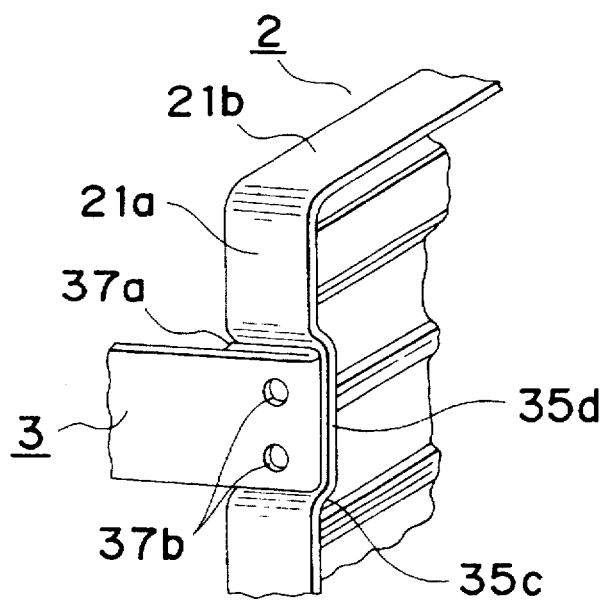
FIG. 14 is a fragmentary perspective view of the end plate according to a fourth embodiment of the present invention.
Figure 15:
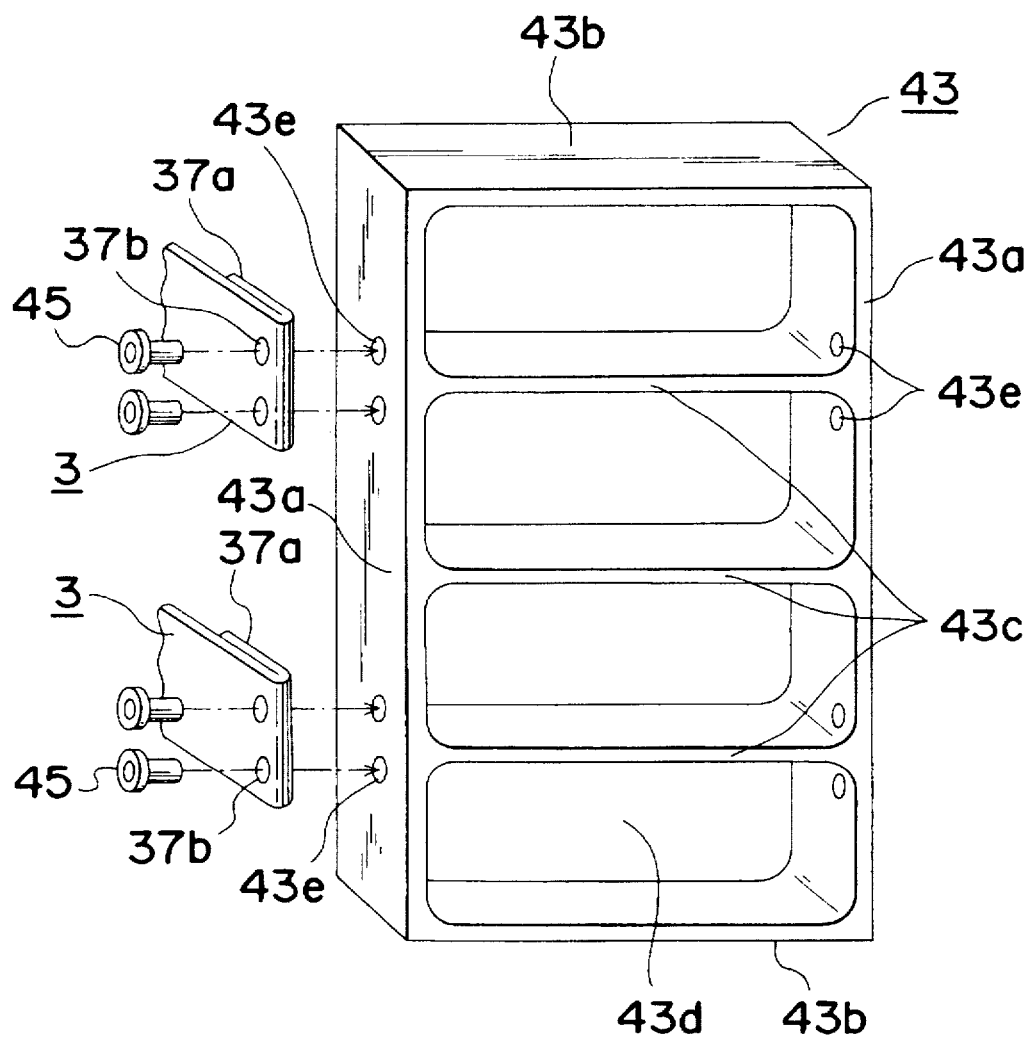
FIG. 15 is a fragmentary perspective view of the end plate, showing an example of application of the present invention to a sample storage battery shown in FIGS. 19 and 20.

Fourth Embodiment (FIGS. 14 and 15)

As an alternative means for increasing the clamp strength of the battery module 1, a fourth embodiment of the present invention is such that not only is each of the end plates 2 reinforced, but also each end of each of the clamp bands 3 is reinforced in a manner which will now be described.

As best shown in FIG. 14, each end of each of the clamp bands 3 is double-walled. This double-walled feature of each end of the respective clamp band 3 can be accomplished either by turning an end extension 37a backwardly so as to overlap with the end of the clamp band 3 as shown therein or by welding an end piece 37a to the end of the clamp band 3 so as to overlap with each other. Reference numeral 37b represents bearing holes defined in the double-walled end of each clamp band 3 for receiving rivets or screws that may be used to connect it to the associated side flange 21a.

The requirement the clamp bands 3 must satisfy is, inter alia:

1) the tensile strength of a substantially or generally intermediate portion of each clamp band 3 must be higher than a standard value, 2) each of the opposite ends of each clamp band 3 which is connected to the associated side flange by means of, for example, screws must have a high bending strength, a high resistance to deformation and is as light as possible, and 3) the peripheral lip region around each bearing hole 37b must have a sufficient resistance to tear.

In the case of the sealed alkaline storage battery of 100 Ah rating employing the previously discussed embodiment, and so long as such sealed alkaline storage battery is used under standard operating conditions, the use of the clamp bands 3 of 1 mm in thickness is effective to satisfy the required tensile strength and the end-to-flange connecting strength. However, it has been found that if the capacity and the density of the battery is increased, and if the battery is used under abnormal operating conditions in which excessive impacts act on the battery, not only are the ends of the clamp bands 3 that are secured to the respective side flanges 21a curved or otherwise deformed undesirably, but the screws used to connect them to the side flanges 21a tend to be loosened. However, the use of the clamp bands 3 having the double-walled ends such as shown in and described with reference to FIG. 14 is effective to satisfy the required end-to-flange connecting strength.

This end-to-flange connecting strength can further be increased if the double-walled ends of the clamp bands 3 are employed in combination with the side flanges 21a in which the band grooves 35d are formed such as shown in FIGS. 10 and 11 or with the double-walled side flanges 21a shown in FIGS. 12 and 13. In any event, the use of the clamp bands 3 each having the double-walled opposite ends is, although it may bring about a slight increase in weight, effective to secure a high end-to-flange connecting strength. It is to be noted that if as shown in FIG. 15 the clamp bands 3 each having the double-walled opposite ends as shown in and described with reference to FIG. 14 are employed in combination with the end plates 43 of the structure shown in FIGS. 19 and 20, the clamp strength can be increased to a value comparable with that exhibited by the embodiment shown in FIG. 14.

Figure 16:
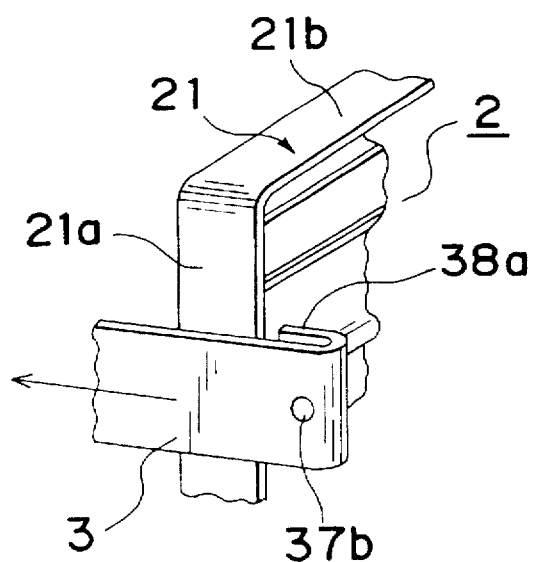
FIG. 16 is a fragmentary perspective view of the end plate according to a fifth embodiment of the present invention.
Figure 17:
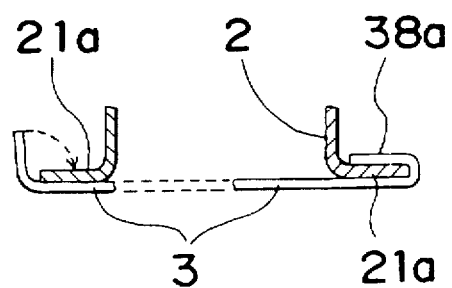
FIG. 17 is a schematic top sectional view of the end plate shown in FIG. 16.

Fifth Embodiment (FIGS. 16 and 17)

In the fifth embodiment of the present invention shown in FIGS. 16 and 17, each of the opposite ends of each of the clamp bands 3 has an end extension 38a which is turned backward to so as to overlap the adjacent end of the respective clamp band 3, but be spaced therefrom a distance corresponding to the thickness of the associated side flange 21a. In other words, the opposite ends of each clamp band 3 shown in FIGS. 16 and 17 are so shaped as to represent hooks which are, when the cells 11 are clamped together with the end plates 2 positioned on respective sides of the assembly of the cells 11, hooked to the side flanges 21a as best shown in FIG. 17. In practice, while the end extension 38a integral with one of the opposite ends of each clamp band 3 is turned backward to represent the hook, the end extension 38a integral with the other of the opposite ends of the respective clamp band 3 is, after the cells 11 have been clamped together, crimped inwardly of the associated clamp band 3 as shown by the phantom line in FIG. 17, to accommodate the thickness of the side flange 21a between it and the end of the clamp band 3.

The clamp bands 3 of the design shown in FIGS. 16 and 17 is particularly advantageous in that not only can the end-to-flange connecting strength be increased as is the case with any one of the foregoing embodiments of the present invention, the clamping of the cells 11 together with the end plates 2 positioned on respective sides of the assembly of the cells 1 can easily be accomplished.

In addition, if the clamp bands 3 having the hooks at their opposite ends such as shown in FIGS. 16 and 17 are employed in combination with the side flanges 21a in which the band grooves 35d are formed such as shown in FIGS. 10 and 11, the necessity of rivetting or screwing for securing the ends of the clamp bands 3 to the side flange 21 can advantageously be dispensed with and this is particularly true if, although not always limited thereto, the battery module 1 is of a compact size.

As hereinbefore described, in any one of the embodiments of the present invention, when the cells 11 are assembled together to provide the battery module 1, the vent spaces 31 are formed between those cells 11 as shown in FIG. 2 because of the provision of the parallel ribs 12a in the vessel 12 of each cell 11. The formation of the vent spaces 31 is advantageous in that when a draft of air is supplied from any suitable source such as, for example, a fan from below or top so as to flow through the vent spaces 31, heat from the cells 11 can be positively dissipated outwardly from the battery module 1 to thereby minimize any possible reduction in characteristic of the battery module which would otherwise occur during the charging or discharge. In particular, where the thermal expansion and the consequent deformation of the cell vessels resulting from an increase in internal pressure inside the storage battery due to, for example, an increase of the hydrogen pressure inside the cells during the charging at elevated temperatures such as often observed with the sealed nickel-hydrogen alkaline storage battery, the enhanced capability of the battery module as a whole to dissipate heat brings about a favorable influence on maintenance of the cells being firmly clamped together and, therefore, the use of any suitable means for holding the cells in spaced relation to each other with the vent spaces 31 defined therebetween is preferred.

Figure 18:
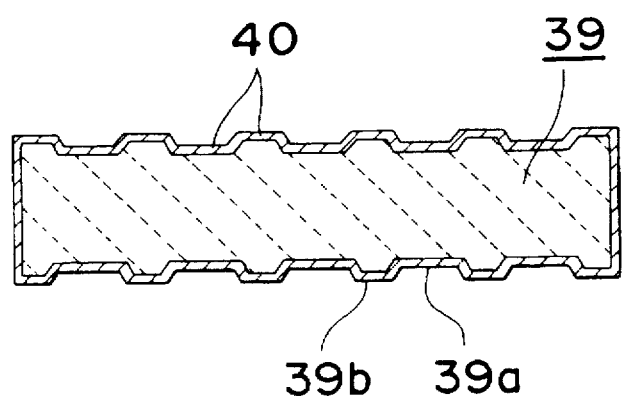
FIG. 18 is a schematic sectional view of the cell that is wrapped with an insulating film.

Although in describing any one of the foregoing embodiments the vessel 12 for each cell 11 has been described as made of synthetic resin such as, for example, polypropylene, the present invention can be equally applied to the cells each employing a metal vessel having so small a wall thickness as to be liable to deformation by the effect of an internal pressure. As shown in a fragmentary sectional representation in FIG. 18, cells shown by 39 and employing the metal vessel may have their peripheral surface covered by an insulating film 40 which may be in the form of a heat shrinkable tube or an adhesive tube or tape of synthetic resin and are assembled together in a manner similar to that shown in FIG. 1. In FIG. 18, grooves 39a and ribs 39b as viewed from bottom of each cell 39 represent the means for holding the cells together in the spaced relation with each other.

In the practice of any one of the foregoing various embodiments of the present invention, each of the end plates is preferably prepared from a sheet of steel, particularly high tensile steel, which is nickel-plated or coated with a rust preventive coating. In terms of weight and workability, the use of a stainless steel plate is more preferred as a material for each of the end plates.

Figure 23:
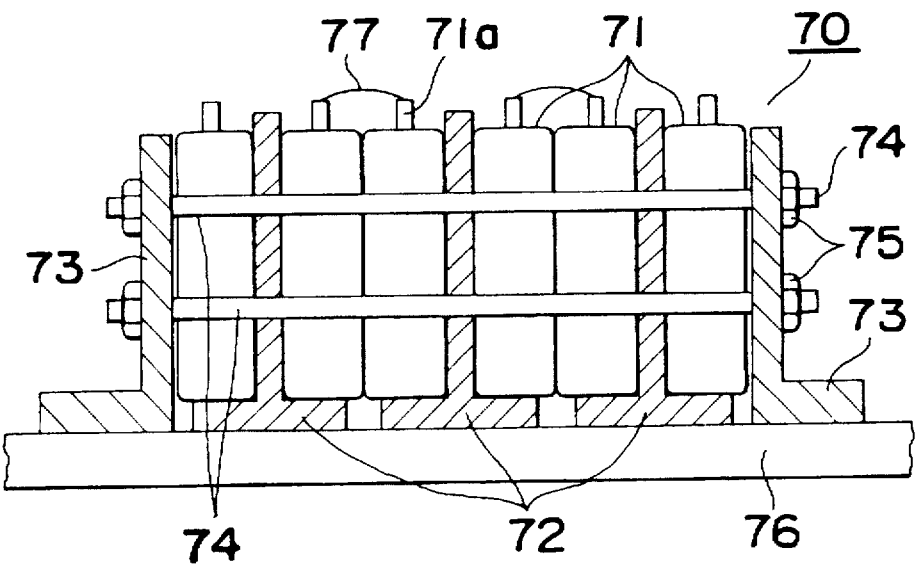
FIG. 23 is a schematic transverse sectional view of one prior art storage battery.
Figure 24:
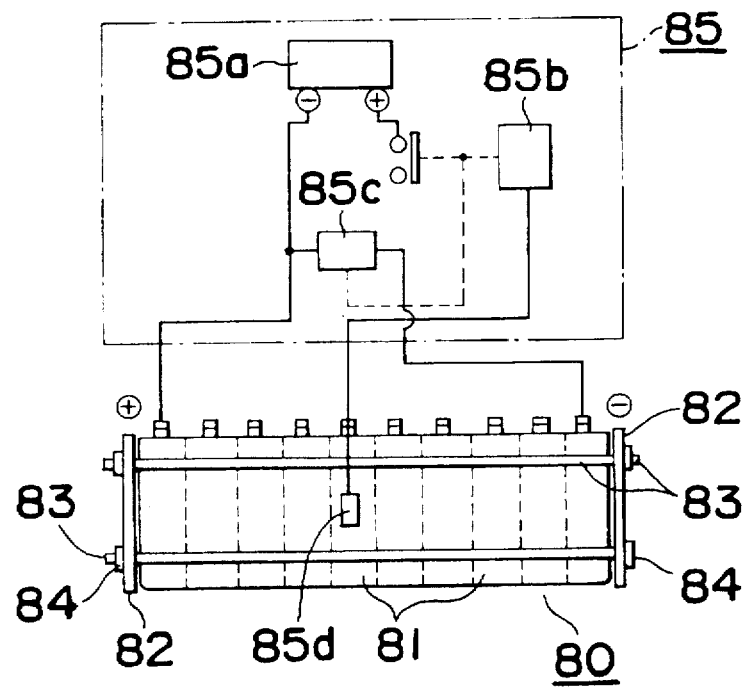
FIG. 24 is a diagram showing another prior art storage battery in combination with a ventilating system.
Figure 27:
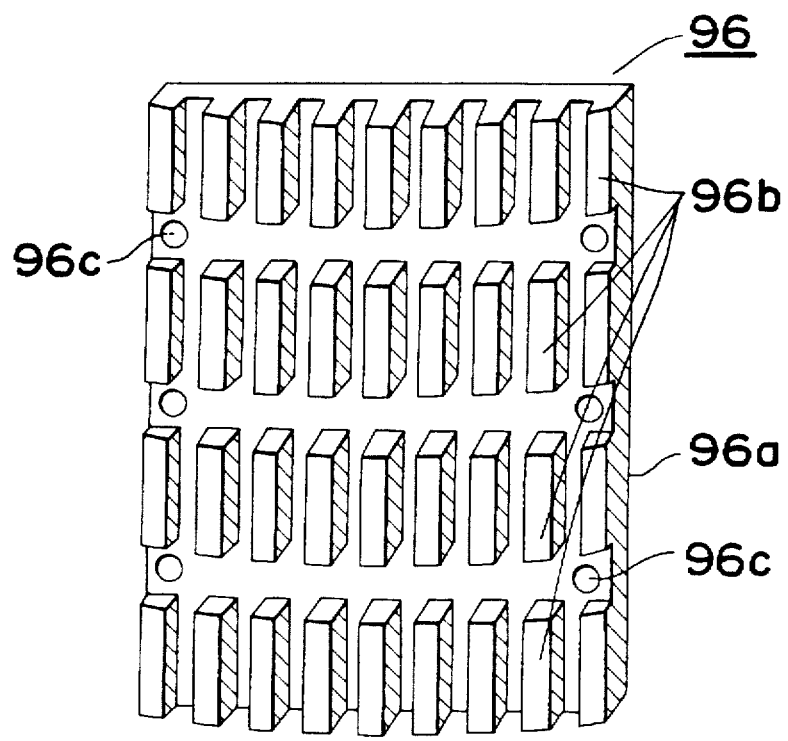
FIG. 27 is a schematic perspective view showing the prior art end plate with fins formed thereon.

As hereinbefore described, the present invention is directed to improvement made in both of the end plates and the clamp bands, used to clamp the cells together, so that the clamp strength can be increased while both reduction in weight and increase in productivity of the storage battery can be accomplished. Since of them the design of the end plates is influential on those characteristics, results of comparative tests are tabulated below in which the storage battery of the present invention according to the first embodiment thereof, the storage battery (Comparison) of the structure shown in FIGS. 19 and 20, the prior art storage battery (Conventional A) of a structure shown in FIGS. 23 to 25 wherein the flat reinforcement made of a hard aluminum alloy and having a thickness of 6 mm is employed, the prior art storage battery (Conventional B) of a structure shown in FIGS. 23 to 25 wherein the flat reinforcement made of a hard aluminum alloy and having a thickness of 8 mm is employed, and the prior art storage battery in which as shown in FIG. 27 the reinforcements 96 having the fins 96b are employed were compared as to clamp strength, weight, productivity and cost. In carrying out the comparative tests, each plate was of a size, 110 mm in the horizontal direction and 140 mm in the vertical direction (height). In Table 1 below, ○ represents the rating of "sufficient or acceptable" and Δ represents the rating of "insufficient or not acceptable because of being heavy".

TABLE 1

| | Clamp Strength | Weight (gr/sheet) | Productivity | Cost |
|---|---|---|---|---|
| Invention | ○ | ○ (188) | ○ | ○ |
| Comparison | ○ | ○ (189) | Δ | Δ |
| Conventional A | Δ | ○-Δ (258) | ○ | ○ |
| Conventional B | ○ | Δ (345) | ○ | Δ |
| Conventional C | ○ | Δ (310) | Δ | Δ |

As can readily be understood from the result of the comparative tests shown in Table 1 above, the storage battery according to the present invention is superior to any one of the other storage batteries listed.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A layer-built sealed alkaline storage battery, comprising a plurality of rectangular cell units, each cell unit including a positive electrode plate, a negative electrode plate, a separator intervening between the positive and negative electrode plates and an alkaline electrolyte accommodated within a vessel sealed with a lid provided with terminals, said cell units being arranged in a row and united together with a pair of end plates arranged at the opposite sides of the assembly of the cells by belt-like clamp bands each extending traversely from one of the end plates through the cell units to the other of the end plates and being fixed at the end thereof on the end plates, wherein the end plate is of one-piece structure having 1) a generally rectangular panel portion or portions and 2) a peripheral wall frame including top, bottom and side flanges to enclose panel portions and protruding outwardly substantially at right angles to the rectangular panel portions and 3) reinforcement ribs arranged parallel to the top and bottom flanges and connected to the opposite side flanges so as to protrude in a direction in which the peripheral wall protrudes from the rectangular panel.

2. The layer-built sealed alkaline storage battery according to claim 1, wherein the top and bottom flanges of the peripheral wall frame is connected to the rectangular panel portion through a rounded juncture and a rib, both extending parallel to the top and bottom flanges and connected to the side flanges.

3. The layer-built sealed alkaline storage battery according to claim 1, wherein the end plate is provided with the opposite side flanges having band grooves where the clamp bands are secured.

4. The layer-built sealed alkaline storage battery according to claim 1, wherein the end-plate is provided with opposite side flanges having a double-wall structure including an inner side flange segment and an outer side flange segment continued from and overlapping the inner side flange segment.

5. The layer-built sealed alkaline storage battery according to claim 1, wherein the opposite ends of each clamp band are so shaped as to represent hooks which are hooked to the side flanges.

6. The layer-built sealed alkaline storage battery according to claim 1, wherein the clamping band has a pair of double walled opposite ends which are able to hook corresponding portions of side walls, so that there can be provided a strong clamping band.

7. The layer-built sealed alkaline storage battery according to claim 1, wherein the cell unit is so designed as to have a space for ventilation between the neighboring cell units.

* * * * *